United States Patent
Kozuka et al.

(10) Patent No.: US 12,197,547 B2
(45) Date of Patent: Jan. 14, 2025

(54) INFORMATION PROVIDING SYSTEM, INFORMATION PROVIDING METHOD AND INFORMATION PROVIDING PROGRAM

(71) Applicant: SEERA NETWORKS, INC., Tokyo (JP)

(72) Inventors: Masahiro Kozuka, Okayama (JP); Ryo Aizawa, Kawasaki (JP)

(73) Assignee: SEERA NETWORKS, INC., Tokyo (JP)

( * ) Notice: Subject to any disclaimer, the term of this patent is extended or adjusted under 35 U.S.C. 154(b) by 0 days.

(21) Appl. No.: 17/912,006

(22) PCT Filed: Mar. 25, 2022

(86) PCT No.: PCT/JP2022/014524
§ 371 (c)(1),
(2) Date: Sep. 15, 2022

(87) PCT Pub. No.: WO2022/210383
PCT Pub. Date: Oct. 6, 2022

(65) Prior Publication Data
US 2024/0211576 A1    Jun. 27, 2024

(30) Foreign Application Priority Data
Mar. 27, 2021    (JP) .................................. 2021-054441

(51) Int. Cl.
*G06F 21/00*    (2013.01)
*G06F 21/10*    (2013.01)
(Continued)

(52) U.S. Cl.
CPC .............. *G06F 21/10* (2013.01); *G06F 21/44* (2013.01); *G06F 21/629* (2013.01)

(58) Field of Classification Search
CPC ................................ G06F 21/44; G06F 21/629
See application file for complete search history.

(56) References Cited

FOREIGN PATENT DOCUMENTS

| JP | 2002-182983 | 6/2002 |
|----|----|----|
| JP | 2003-044297 | 2/2003 |

(Continued)

OTHER PUBLICATIONS

PCT International Search Report for corresponding PCT Application No. PCT/JP2022/014524, 9 pages.

(Continued)

*Primary Examiner* — Rodman Alexander Mahmoudi
(74) *Attorney, Agent, or Firm* — Dority & Manning, P.A.

(57) ABSTRACT

An information providing system, an information providing method, and an information providing program as configured herein can allow an information provider to limit the use of information on a program and verify the program when information provided by the information provider is arithmetically processed by the program in the arithmetic processing device. In one aspect, an information providing system includes: an information providing device; and an arithmetic processing device for performing arithmetic processing by a predetermined arithmetic processing program on the basis of information provided by the information providing device, wherein in addition to request data, additional information, in which usage conditions for using the request data are defined, is added to the information provided by the information providing device, and in the arithmetic processing device, arithmetic processing by the arithmetic processing program is performed within a range of the usage conditions defined in the additional information.

9 Claims, 4 Drawing Sheets

(51) Int. Cl.
    *G06F 21/44*     (2013.01)
    *G06F 21/62*     (2013.01)

(56) References Cited

FOREIGN PATENT DOCUMENTS

| | | | |
|---|---|---|---|
| JP | 2003-087237 | | 3/2003 |
| JP | 2004362229 A | * | 12/2004 |
| JP | 2005-010829 | | 1/2005 |
| JP | 2012-234362 | | 11/2012 |
| JP | 2014-010598 | | 1/2014 |
| JP | 2019-047334 | | 3/2019 |
| JP | 7205793 B2 | | 10/2022 |
| WO | WO-2020144729 A1 | * | 7/2020 ............. G06F 21/44 |

OTHER PUBLICATIONS

Decision to Grant Patent received in corresponding Application No. JP 2021-054441, dated Oct. 7, 2022, 5 pages.
Office Action (with English translation) received in corresponding Application No. 2021-054441, dated Jun. 1, 2022, 12 pages.

\* cited by examiner

INFORMATION PROVIDING SYSTEM, INFORMATION PROVIDING METHOD AND INFORMATION PROVIDING PROGRAM

CROSS-REFERENCE TO RELATED APPLICATIONS

This application is a national phase application of International Application No. PCT/JP2022014524, filed Mar. 25, 2022, which, in turn, is based upon and claims the right of priority to Japanese Patent Application No. 2021-054441, filed on Mar. 27, 2021, the disclosures of both of which are hereby incorporated by reference in their entirety for all purposes.

TECHNICAL FIELD

The present invention relates to an information providing system, an information providing method and an information providing program.

BACKGROUND ART

Large scale data processing, such as regression analysis and machine learning using big data, and analysis for finding relationships from big data, are processed by an independent large-scale computer system. In recent years, with the development of network technology, arithmetic processing by distributed processing has become widespread, and the arithmetic processing in the patent literature 1 and the patent literature 2 are known as systems for providing information to arithmetic devices such as personal computers managed by other persons (hereinafter referred to as "PC").

In the patent literature 1, there is described a system for managing use of contents. In that system for managing use of contents provided by a service provider for a user device, the user device receives an authority certificate for using the contents from the service provider, and an encrypted content key is stored in the authority certificate. The user device executes decryption process to the encrypted content key to obtain a content key. Then, the user device executes decryption process to the encrypted contents using the obtained content key to obtain the contents.

Further, the authority certificate for using the contents in the patent literature 1 has a configuration in which an electronic signature of the issue entity of the authority certificate is added, and the decryption process of the encrypted content key in the authority certificate is executed only when it is confirmed by verifying the electronic signature that the data have not been tampered with.

In the patent literature 2, there is described technique in which, in a method for controlling access to a database, a safety verification process for verifying the safety of a program is included and on the basis of the verification result in the safety verification process, the program is provided with the authority for accessing the data.

Further, in the patent literature 2, it is described that the safety verification of the program may be performed by confirming the authentication by an external authentication body, by confirming the signature or the like of a creator recorded in the program, or by analyzing a code of the program to confirm the operation contents.

CITATION LIST

Patent Literature

[Patent Literature 1] JP 2003-087237 A
[Patent Literature 2] JP 2002-182983 A

SUMMARY OF INVENTION

Technical Problem

Conventionally, distributed processing of highly confidential information including personal information with a large number of participants has not been performed so far. That is, in the system for managing use of contents described in the patent literature 1, the authority for using the contents of users is not managed for each user on the service provider side, and the contents can be used only by legitimate users, and further, although it is possible to set various usage restrictions depending on users such as a period limit and a number of times limit, the contents to be handled are comics and video, and the system is not a system in which the users can perform arithmetic processing using the contents.

Further, although the patent literature 2 discloses safety verification of a program, it is verification regarding program processing on the own PC, and it is not premised that information in the database is provided to other PCs.

Therefore, the object of the present invention is to provide an information providing system, an information providing method and an information providing program with which an information provider can limit the use of information on a program and verify the program when information provided by the information provider is arithmetically processed by the program in the arithmetic processing device.

Solution to Problem

The above object of the present invention can be achieved by the following configuration. That is, an information providing system in the first aspect of the present invention comprises:
  an information providing device for storing information and for providing information in response to request from an arithmetic processing device; and
  the arithmetic processing device for performing arithmetic processing by a predetermined arithmetic processing program on the basis of the information provided by the information providing device, wherein
  in addition to request data requested by the arithmetic processing device, additional information, in which usage conditions for using the request data are defined, is added to the information provided by the information providing device, and
  in the arithmetic processing device, arithmetic processing by the arithmetic processing program is performed within a range of the usage conditions defined in the additional information.

An information providing system in the second aspect of the present invention is that, in the information providing system in the first aspect, the arithmetic processing device includes a program verification section for verifying whether or not arithmetic processing by the arithmetic processing program is within the range of the information usage conditions, and
  only in a case where the arithmetic processing program is authenticated by the program verification section, the request data are provided to the arithmetic processing program in the arithmetic processing device.

An information providing system in the third aspect of the present invention is that, in the information providing system in the second aspect, the additional information includes at least authority information that defines a range of arithmetic processing allowed for the arithmetic processing program in the arithmetic processing device.

An information providing system in the fourth aspect of the present invention is that, in the information providing system in the second or third aspect, the additional information includes at least data for verification used for the verification and arithmetic result data for verification used for the verification.

An information providing system in the fifth aspect of the present invention is that, in the information providing system in the fourth aspect, among the provided information, at least the request data, the data for verification and the arithmetic result data for verification are encrypted in an information providing device and transmitted to the arithmetic processing device, and in the arithmetic processing device, the program verification section decrypts the encrypted provided information.

An information providing system in the sixth aspect of the present invention is that, in the information providing system in the fourth or fifth aspect, the program verification section verifies the arithmetic processing program by verifying whether or not result of arithmetic processing using the data for verification by the arithmetic processing program matches the arithmetic result data for verification.

An information providing system in the seventh aspect of the present invention is that, in the information providing system in the sixth aspect, the program verification section further verifies the arithmetic processing program by verifying whether or not, if the arithmetic processing program performs arithmetic processing using the data for verification in the arithmetic processing device, the arithmetic processing is within the defined range of arithmetic processing in the authority information.

An information providing method in the eighth aspect of the present invention is a method in which arithmetic processing is performed by a predetermined arithmetic processing program in an arithmetic processing device on the basis of provided information provided in response to request to an information providing device comprises the steps of:

requesting provided information to the information providing device;

receiving, in addition to request data included in the information provision, additional information in which usage conditions for using the request data are defined; and performing arithmetic processing by the arithmetic processing program within a range of the usage conditions defined in the additional information.

An information providing method in the ninth aspect of the present invention, in the information providing method in the eighth aspect, further comprises the steps of:

verifying whether or not the arithmetic processing by the arithmetic processing program is within the range of the information usage conditions; and providing the request data to the arithmetic processing program only in a case where the arithmetic processing program is authenticated in the step of verifying the arithmetic processing.

An information providing program in the tenth aspect of the present invention executes each step of the information providing method in the eighth or ninth aspect by a computer device.

Advantageous Effect of Invention

According to embodiments of the present invention, it is possible to provide an information providing system, an information providing method and an information providing program in which, when information provided by an information provider is arithmetically processed by a program in an arithmetic processing device, the information provider can restrict the use of information on the program and verify the program.

DESCRIPTION OF EMBODIMENTS

Hereinafter, an information providing system, an information providing method and an information providing program according to embodiments of the present invention will be described with reference to drawings. However, the embodiments described below are only for exemplifying an information providing system, an information providing method and an information providing program for embodying the technical concept of the present invention. The present invention is not limited to these embodiments and can be equally applied to other embodiments included in claims.

First Embodiment

An information providing system, an information providing method and an information providing program according to the first embodiment of the present invention will be described with reference to FIGS. 1 and 2.

Figure 1:
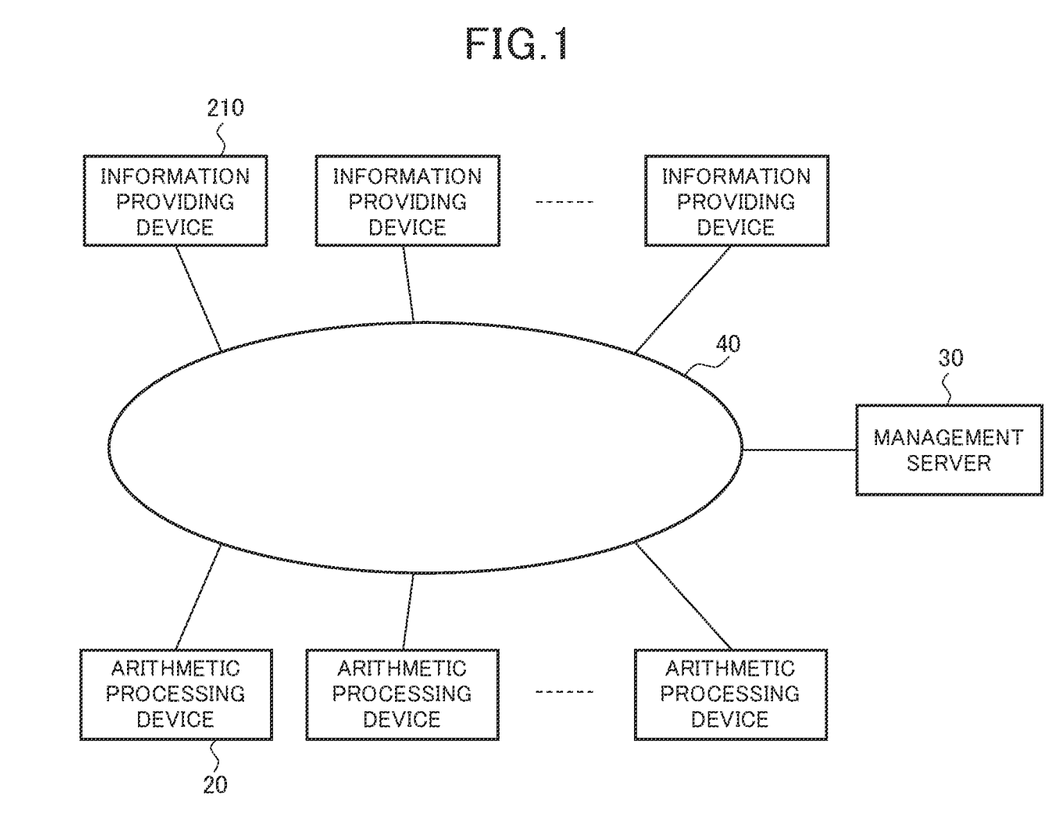
FIG. 1 is an overall block diagram of an information providing system.

FIG. 1 is an overall block diagram of the information providing system. The information providing system includes information providing devices 10, arithmetic processing devices 20 and a management server 30. The information providing devices 10, the arithmetic processing devices 20 and the management server 30 are connected by an information network 40. One or more information providing devices 10 and arithmetic processing devices 20 are provided.

Figure 2:
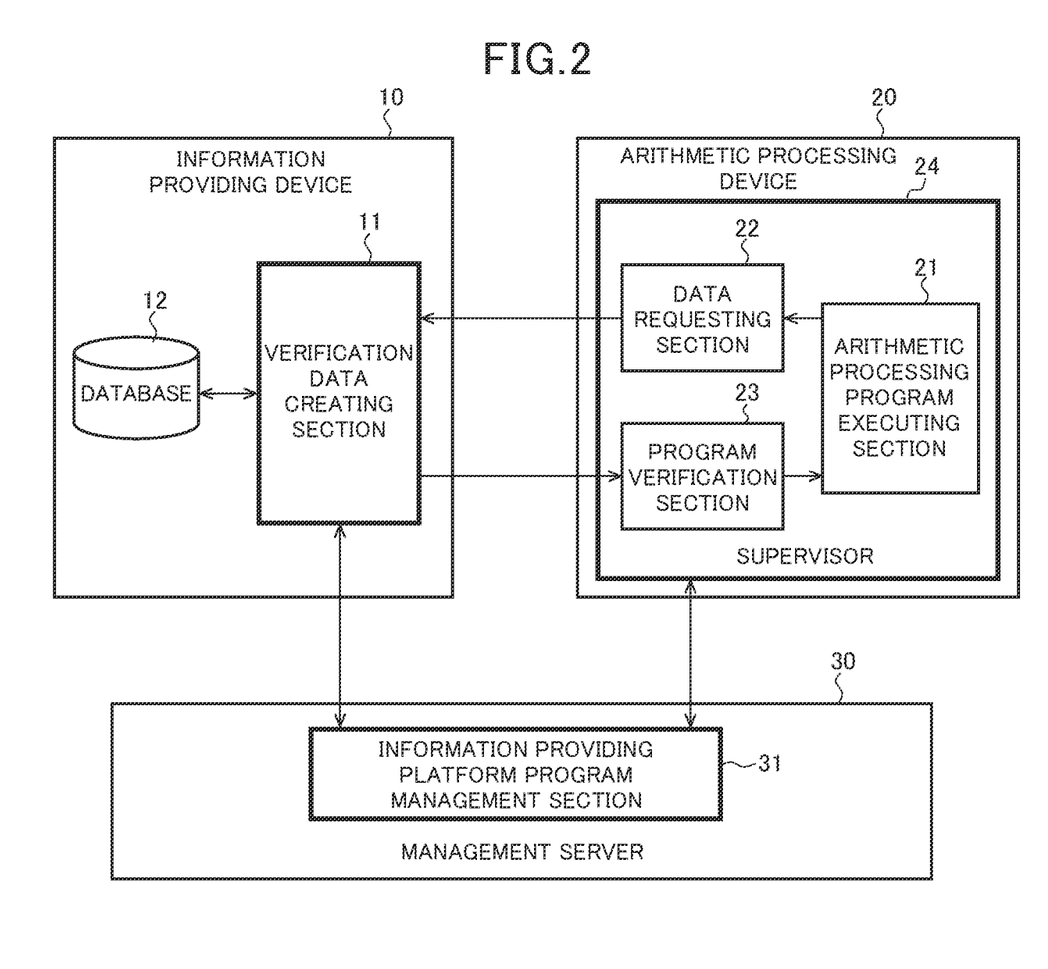
FIG. 2 is an explanatory diagram of operation of an information providing system.

FIG. 2 is an explanatory diagram of operation of the information providing system. The information providing device 10 includes a verification data creating section 11 and a database 12. The verification data creating section 11 and the database 12 are connected to each other, and information of the database 12 can be provided to the arithmetic processing device 20 via the verification data creating section 11.

In response to data request information from a data requesting section 22 in the arithmetic processing device 20, the verification data creating section 11 outputs data for verification and arithmetic result data for verification used for verification of arithmetic processing as described later by arithmetic operation of a CPU (not shown). The arithmetic operation is based on a program for the information providing device provided by an information providing platform program management section 31. Further, on the basis of data usage restriction information set in advance by input/output means (not shown) or the like, the verification data creating section 11 creates authority list data for the arithmetic processing device by the arithmetic operation of the CPU according to the program for the information providing device. Further, the verification data creating section 11 accesses the database 12 according to the program for the information providing device and obtains request data, which are the data actually to be used for the arithmetic operation of the arithmetic processing device 20. Then, the verification data creating section 11 transmits these data as provided information to a program verification section 23 in the arithmetic processing device 20.

The arithmetic processing device 20 has an arithmetic processing program executing section 21, the data requesting section 22 and the program verification section 23. The arithmetic processing program executing section 21, the data requesting section 22 and the program verification section 23 are all managed by a supervisor 24. Here, the supervisor 24 is a program that exclusively (for example, in a way in which others are not allowed to browse or the like without any restrictions) manages resources managed by the OS. In other words, the supervisor 24 is a program that manages the OS in a controlled environment. For example, on the basis of the program for the arithmetic processing device provided by the information providing platform program management section 31, the resources managed by the OS can be exclusively managed by the kernel.

The arithmetic processing program executing section 21 causes the data requesting section 22 to request the information providing device 10 to transmit data that are requested by the arithmetic processing program. In response to this request, the information providing device 10 transmits the provided information including the request data to the program verification section 23. The program verification section 23 verifies the arithmetic processing program, and if the arithmetic processing program is appropriate, the request data are provided to the arithmetic processing program executing section 21.

Both the data requesting section 22 and the program verification section 23 are managed by the supervisor 24 according to the program for the arithmetic processing device. Under the management, in a secure OS environment, various arithmetic processing are executed by the CPU in the arithmetic processing device 20 (not shown). The various arithmetic processing are, for example, arithmetic processing of data request information by the data requesting section 22, verifying the program by the program verification section 23 and providing request data to the arithmetic processing program by the program verification section 23. Similarly, processing in the arithmetic processing program executing section 21 is also executed by the CPU in the secure OS environment.

The information providing device 10 and the arithmetic processing device 20 are connected to the management server 30, and programs of the verification data creating section 11 in the information providing device 10 and programs of the supervisor 24 in the arithmetic processing device 20 are provided by the information providing platform program management section 31 in the management server 30. As a result, in the information providing system, information is provided and used in the controlled environment on the information providing platform. Algorithms of data encryption, data decryption and electronic signature in communicating between the information providing device 10 and the arithmetic processing device 20 are also managed by the information providing platform program management section 31.

Hereinafter, a procedure for providing request data from the information providing device 10 to the arithmetic processing device 20 will be described.

(1) In response to request from the arithmetic processing program executing section 21, the data requesting section 22 creates data request information for requesting request data required by the arithmetic processing program from each information providing device 10.

(2) The data request information is transmitted from the data requesting section 22 to the verification data creating section 11 in the information providing device 10.

(3) The verification data creating section 11 creates verification data for verifying a target arithmetic processing program.

(4) The verification data creating section 11 transmits the request data and provided information including additional information to the program verification section 23 in the arithmetic processing device 20. Here, the additional information defines a range of arithmetic processing and conditions of usage restrictions, which are allowed for the arithmetic processing program.

(5) When the target arithmetic processing program is authenticated in the program verification section 23, the request data are provided to the arithmetic processing program executing section 21, and the arithmetic processing by the arithmetic processing program is executed.

Hereinafter, the creation of the data request information in the above (1) will be described in detail. The arithmetic processing program to be processed, which is to be executed by the arithmetic processing program executing section 21, is a Rust program such as a following arithmetic processing program P1. The arithmetic processing program P1 is an example of linear regression analysis, and performs linear regression using the least squares method (OLS) on required data (data group).

Arithmetic Processing Program P1

The data request information includes information of request data, which are required for performing linear regression using the least squares method (that is, an instruction regarding the request data), and information of the arithmetic processing program P1 as an arithmetic program to be processed, that is, for example source program information. The information of the arithmetic processing program is not limited to source programs, but may be any information as long as the information can specify the relationship between the output and the input, for example, the information that can grasp the processing content of the arithmetic processing program. For example, directly connecting to a dedicated hardware whose processing contents have been verified and confirmed in advance or connecting to such hardware in series is also permittable.

In the above (2), the data request information is transmitted from the data requesting section 22 to the verification data creating section 11 in the information providing device 10. It is desirable that the data request information is encrypted according to a protocol managed by the information providing platform program management section 31.

The creation of verification data in the verification data creating section 11 in the above (3) will be described in detail. If data request information is encrypted, the verification data creating section 11 decrypts the data request information according to the protocol managed by the information providing platform program management section 31. Next, the verification data creating section 11 creates information for defining a range of arithmetic processing allowed for the arithmetic processing program to be processed by the arithmetic processing device 20.

The verification data creating section 11 analyzes processing contents of the arithmetic processing program added to the data request information, creates information necessary for verifying whether or not the arithmetic processing program is appropriate and adds the information to provided information. Therefore, provided information transmitted from the verification data creating section 11 to the program verification section 23 includes following information.
(a) Authority information such as an authority list that defines a range of arithmetic processing and conditions for usage restrictions allowed for the arithmetic processing program in the arithmetic processing device.
(b) Data for verification
(c) Arithmetic result data for verification used for verification of arithmetic processing
(d) Request data (data used for the actual arithmetic operation)

In the above (4), the verification data creating section 11 transmits to the program verification section 23 in the arithmetic processing device 20 provided information including request data and additional information defining a range of arithmetic processing allowed for the arithmetic processing program. Among the provided information, it is desirable that at least the above (b). (c) and (d) are encrypted according to the protocol managed by the information providing platform program management section 31. The above (a) may also be encrypted. Furthermore, by adding an electronic signature to the provided information, falsification can be prevented more reliably.

The processing of the program verification section 23 in the above (5) will be described in detail. In the program verification section 23, the above (b) and (e) included in the provided information are used to verify whether or not the result of executing the processing program to be data processed using the data for verification in the above (b) matches the arithmetic result data for verification used for the verification of arithmetic processing in the above (e).

Further, it is determined whether or not, if the processing program to be data processed is executed using the data for verification in the above (b), the processing program does not perform processing that exceeds the range allowed in the authority information in the above (a).

For example, regarding data saving, if saving arithmetic results is permitted but saving request data itself is not permitted in an authority list as authority information, the arithmetic processing device 20 is permitted to save arithmetic result, but is not permitted to separately save request data itself. Therefore, it is verified whether or not, if the processing program to be data processed is executed using the data for verification in the above (b), the data saving is within the range of the authority list.

The supervisor 24 in the arithmetic processing device 20 is always operated in the environment controlled by the program provided by the information providing platform program management section 31. Therefore, arithmetic processing of arithmetic processing programs executed in the program verification section 23 and the arithmetic processing program executing section 21 in the arithmetic processing device 20 can be always monitored by the supervisor 24, and processing contents such as data saving, data transfer, and data deletion are always grasped. Therefore, in the information providing system of the present example, it is possible to verify appropriately whether or not, if the processing program to be data processed is executed using the data for verification in the above (b), data saving is within the range of the authority list.

In a case where the result of executing the arithmetic processing program to be processed using the data for verification in the above (b) in the program verification section 23 matches arithmetic result data for verification used for the verification of arithmetic processing in the above (c) and where it is determined that, if the processing program to be data processed is executed using the data for verification in the above (b), the processing program does not perform processing that exceeds the allowed range in the authority information in the above (a), the arithmetic processing program to be processed is determined to be appropriate, that is, the arithmetic processing program is authenticated as an appropriate arithmetic processing program.

If the arithmetic processing program is authenticated as an appropriate program, request data in the above (d) are provided to the arithmetic processing program, and the arithmetic processing program performs an actual arithmetic operation using the request data in the arithmetic processing program executing section 21.

Figure 3:
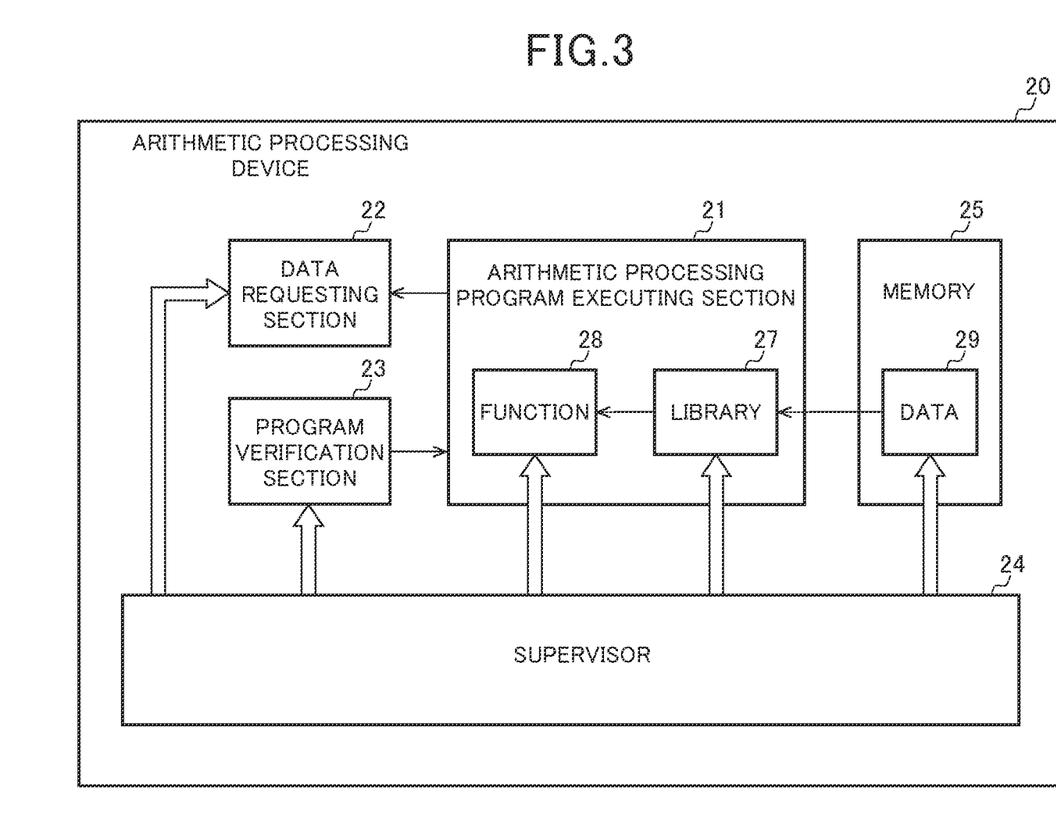
FIG. 3 is an explanatory diagram of operation of an arithmetic processing device.

FIG. 3 is an explanatory diagram of operation of the arithmetic processing device 20. The data requesting section 22, the program verification section 23, the arithmetic processing program executing section 21, a memory 25 and other input/output devices (not shown) are all processed in an environment managed by the supervisor 24. As a result, a state in which all operations of the OS can be managed by the supervisor 24, that is, a secure execution environment of the OS can be realized. The explanatory diagram of operation of the arithmetic processing device 20 in FIG. 3 is an example of the present embodiment, and the OS can be secured by various other configurations.

In the arithmetic processing program executing section 21, a function 28 sends and receives all data via a library 27. A library-dedicated area that can be accessed only by the library 27 is virtually provided in the memory 25. For example, request data obtained via the program verification section 23 are stored in the library-dedicated area in the memory 25. Further, for example in FIG. 3, data 29 is stored in the library-dedicated area in the memory 25. The function 28 can access request data stored in the library-dedicated area in the memory 25. Then, the function 28 receives the data 29 of the memory 25 via the library 27. The function 28 uses the received data to perform an arithmetic operation according to the function 28 by the CPU in the arithmetic processing device 20. After the arithmetic operation of the function 28 is completed, only the final arithmetic result list by the arithmetic processing program is provided to a user, and the data used during the arithmetic operation in the area of the data 29 in the memory 25 are completely deleted. The method for completely deleting the data is not particularly limited, but an appropriate method such as filling all the data with "O" can be adopted. Further, the function 28 provides a user with only the arithmetic result list.

As described above, since the function 28 sends and receives all data via the library 27 under the complete management by the supervisor 24, request data and data used during an arithmetic operation are not left in the area other than the library-dedicated area in the memory 25 in the arithmetic processing device 20, and the request data are stored only in the library 27 in a state in which the supervisor 24 can be managed. Therefore, the supervisor 24 can use the request data within the range of the authority defined in the authority list received from the information providing device 10, and can reliably manage the request data in the library. Further, as described above, the data in the library dedicated area in the memory 25 can be completely deleted.

Here, an example of securing the OS has been described, but it is also possible to manage operations of the arithmetic processing device by the supervisor 24 by virtualizing an application used in arithmetic operations of the arithmetic processing program executing section 21. In such a case, after an arithmetic operation by the application is started and before request data are called by the application, the application is operated in a virtual environment (hereinafter referred to as "secure environment") in which the supervisor 24 manages all operations. Next, when an arithmetic result is output from the application, the supervisor 24 provides only the arithmetic result list to a user, and after deleting request data and data used during the arithmetic operation, the application is returned from the secure environment to the normal arithmetic environment of the arithmetic processing device 20. Therefore, even in the case of virtualizing an application, since the supervisor 24 manage the application in the secure environment, the supervisor 24 monitors that the operation is within the range of the authority defined in the authority list received from the information providing device 10. That is, according to the definition in the authority list, it is prohibited to restrict output to a console, write data to a file, perform network communication and the like. Further, for example, by using an authenticated GPU, only the arithmetic result can be presented to a user under the control of the supervisor 24.

Modified Example

Figure 4:
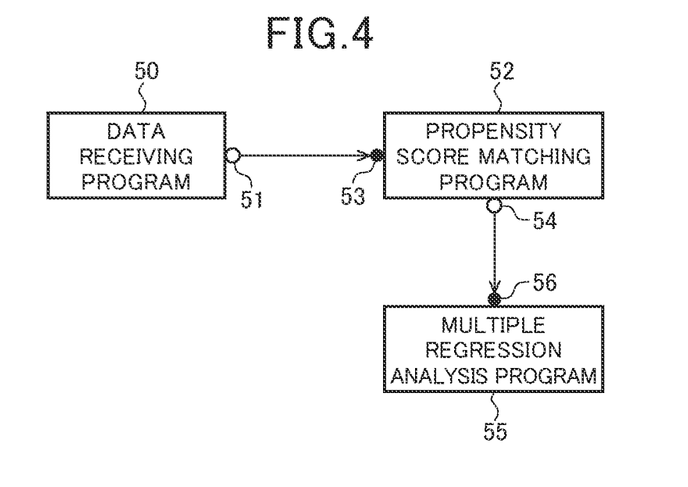
FIG. 4 is an explanatory diagram of a combination program.

In the above example of the present embodiment, an example of authenticating programs one by one has been described. Hereinafter, an example, in which a plurality of programs are authenticated in advance and a plurality of the authenticated programs are combined to perform an arithmetic operation, will be described as a modified example. With reference to FIG. 4, the modified example of the present embodiment will be described. FIG. 4 is an explanatory diagram of a combination program. In the modified example, a program (hereinafter referred to as "combination program"), in which a plurality of programs authenticated in advance in the program verification section 23 are combined and a predetermined arithmetic operation is performed using request data, will be described.

A data receiving program 50 is a program for receiving request data received via a communication network such as the Internet and for outputting the request data in a state where arithmetic processing can be performed. The request data are output from an output section 51 of the data receiving program 50.

A propensity score matching program 52 is a program that performs an arithmetic operation of a propensity score matching using request data. In the propensity score matching program 52, for example, matching of people with similar educational backgrounds, matching of people with similar incomes and the like can be performed by using request data. An input section 53 of the propensity score matching program 52 receives request data from the output of the data receiving program 50, an arithmetic operation of the propensity score matching is performed in the propensity score matching program 52, and an output section 54 outputs result of the propensity score matching.

In a multiple regression analysis program 55, the result of the propensity score matching from the output section 54 of the propensity score matching program 52 is received by an input section 56, and the multiple regression analysis can be performed, for example, the relationship between educational background and income can be analyzed.

In this way, in the combination program shown in FIG. 4, the result list obtained by performing multiple regression analysis of propensity score matching data on the basis of request data is provided to a user. However, as described above, under the complete control of the supervisor 24, request data and data used during the arithmetic operation are deleted and are not left in the arithmetic processing device. However, a partial program operates in the arithmetic processing program executing section in the arithmetic processing device, and the output data are not deleted and can be used as subsequent input data by setting cooperation between the output section and the input section. Also in this case, only a result list finally obtained in the combination program is provided to a user, and all the data used during the arithmetic operation are deleted after the arithmetic operation is completed.

Next, the procedure of the pre-authentication (authentication in advance) for performing the arithmetic operation by the combination program will be described.

(1) Regarding a partial program Pi, which is one of the n combination programs Pi (i=1 to n) to be executed, the type of input that can be processed by the target partial program Pi and the type of output that is returned as a result by the target partial program Pi are registered in advance.

(2) In the arithmetic processing device 20, a pre-authentication program Ai (i=1 to n) for performing pre-authentication of the target partial program Pi is automatically generated under the control of the supervisor 24. The pre-authentication program Ai is a program that uses the authority of the supervisor 24 and is a function for internally calling the target partial program Pi. The pre-authentication program Ai transmits to each information providing device 10 through the data requesting section 22 a pre-approval request corresponding to the type of input that can be processed by the target partial program Pi and the type of output that is returned by the target partial program Pi as a result.

(3) In the verification data creating section 11 in the information providing device 10, verification data for verifying the partial program Pi that is the target of the pre-authentication program Ai are created.

(4) From the verification data creating section 11 in the information providing device 10 to the program verification section 23 in the arithmetic processing device 20, the verification data, arithmetic result data for verification used for verification of arithmetic processing, and information for verifying partial programs including additional information that defines a range of arithmetic processing allowed for the arithmetic processing program and conditions of usage restrictions are transmitted.

(5) If the pre-authentication program Ai authenticates the corresponding partial program Pi as an appropriate arithmetic processing program in the program verification section 23, the partial program Pi is stored in the arithmetic processing device 20 as a pre-authenticated partial program Pi and can be called from the arithmetic processing program executing section 21. More specifically, the pre-authentication program Ai verifies whether or not the result of executing the partial program Pi using the data for verification matches the arithmetic result data for verification. Further, the pre-authentication program Ai determines whether or not, if the partial program Pi is executed, the partial program Pi does not perform processing that exceeds the range of the arithmetic processing defined in the additional information and the range allowed in the conditions of usage restrictions.

(6) The procedure of the pre-verification of the partial program in the above (1) to (5) is repeated for the required number n of the partial programs Pi (i=1 to n).

(7) In the arithmetic processing program executing section 21, a combination program in which a plurality of the pre-authenticated partial programs Pi are combined is created. When the combination program is executed, in response to request from the data requesting section 22, request data are transmitted from the information providing device 10 to the program verification section 23 in the arithmetic processing device 20. In the program verification section 23, the request data are provided to the combination program within the range defined as the range of arithmetic processing allowed for each partial program, and the target arithmetic operation is performed. The result list of the arithmetic processing obtained in the arithmetic processing program executing section 21 is provided to a user, and since the arithmetic operation is executed in the environment completely managed by the supervisor 24 as described above, the request data and data used during the arithmetic operation are deleted according to the conditions of usage restrictions and are not left in the arithmetic processing device 20.

Meaningful analysis results may not be obtained by merely performing multiple regression analysis. However, in such cases, it is easy to obtain meaningful result if propensity score matching is performed and then multiple regression analysis is performed on that result. Therefore, as in the present modified example, it becomes easy to obtain meaningful result by combining each analysis process in order.

Second Embodiment

Figure 5:
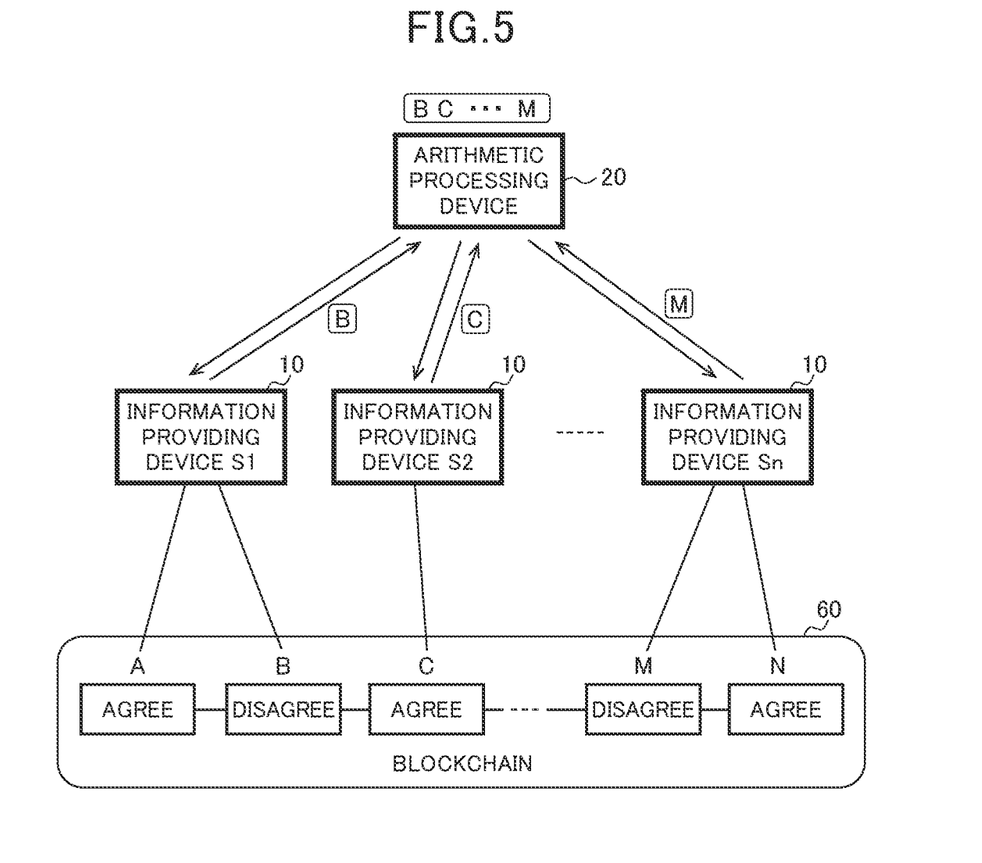
FIG. 5 is an explanatory diagram when the information providing system is applied to an electronic voting system.

An information providing system, an information providing method and an information providing program according to the second embodiment of the present invention will be described with reference to FIG. 5. FIG. 5 is an explanatory diagram when the information providing system described in the first embodiment is applied to an electronic voting system. In FIG. 5, the same reference numerals are used for the same configurations as those in the first embodiment, and the description thereof will be omitted.

A case where a ballot counting program aggregates ballot information (ID list) of ballots (A. B, . . . , N) indicating voting result in the arithmetic processing device 20 will be described.

(1) Through communication networks, the arithmetic processing device 20 transmits data request information to each of information providing devices S1, S2 to Sn corresponding to a voter list so that the information providing devices S1, S2 to Sn provide ballot information to the arithmetic processing device 20.

(2) Information providing devices S1, S2 to Sn provide ballot information in response to request from the arithmetic processing device 20.

(3) If a ballot aggregation program is authenticated, in the arithmetic processing device 20, the voter list is input into the ballot aggregation program, and then the ballot aggregation program uses each ballot information (B, C, . . . , M) to aggregate the voting results. Note that, in FIG. 5, an example is shown in which the information providing device S1 stores the ballot information A and B, but a voter cancels the ballot information A and finally the ballot information B is used as a valid vote.

(4) The ballot aggregation program provides a user with a ballot result list, and since the arithmetic operation is performed in the completely controlled environment by the supervisor 24 as in the first embodiment, the request data (each ballot information) and data used during the arithmetic operation are deleted and are not left in the arithmetic processing device 20.

In the present embodiment, regarding the ballot information stored in the information providing devices S1. S2 to Sn, change history is recorded and is stored in a database for preventing falsification. Blockchain can be adopted as a database for storing ballot information, but the database is not limited to the blockchain and may be in another distributed storage format or the like. If blockchain is adopted, the arithmetic processing device 20 can obtain desired ballot information by transmitting data request information to each information providing device 10, and falsification can be prevented by recording the change history.

Although some embodiments of the present invention have been described above, these embodiments only exemplify information providing systems, information providing methods and information providing programs for embodying the technical concept of the present invention. The present invention is not limited to these embodiments, and can be equally applied to other embodiments. Further, it is possible to omit, add or change a part of these embodiments, or to combine the aspects of each embodiment.

REFERENCE SIGNS LIST 10 information providing device
11 verification data creating section
12 database
20 arithmetic processing device
21 arithmetic processing program executing section
22 data requesting section
23 program verification section
24 supervisor
25 memory
27 library
28 function
29 data
30 management server
31 information providing platform program management section
40 information network
50 data receiving program
51 output sections
52 propensity score matching program
53 input section
54 output section
55 multiple regression analysis section
56 input section
Ai pre-authentication program
P1 arithmetic processing program
Pi partial program

The invention claimed is:
1. An information providing system comprising:
an information providing device for storing information and for providing information in response to a request from an arithmetic processing device; and the arithmetic processing device for performing arithmetic processing by a predetermined arithmetic processing program on the basis of provided information provided by the information providing device, wherein:
the information providing device comprises:
an information storage unit that stores the information,
an information provision section provides the information to the arithmetic processing device as the provided information in response request data requested by arithmetic processing device, and
an additional information generating unit which creates an additional information including a verification data for authenticating whether or not the arithmetic processing program of the arithmetic processing device is an appropriate program and information usage conditions which are the conditions under which the provided information is used in the arithmetic processing device for the arithmetic processing, and adds the additional information in addition to the request data provided information to be provided to the arithmetic processing device;
the arithmetic processing device comprises:
an arithmetic processing unit which executes an arithmetic processing using the arithmetic processing program,
a program verification section which causes the arithmetic processing program to execute a verification operation using the verification data and verifies whether or not verification arithmetic processing is within the range of the information usage conditions, and
a request data provision section which determines whether or not to provide the request data to the processing program based on a result of the verification for verifying whether or not verification arithmetic processing is within the range of the information usage conditions,
wherein the program verification section verifies whether or not verification arithmetic processing is within the range of the information usage conditions based on the result of the verification for verifying whether or not the verification arithmetic processing by the arithmetic processing program is within the range of the information usage conditions, only when the program verification section verifies the arithmetic processing program as an appropriate program which satisfies the information use conditions included in the additional information, the request data provision section provided the request data to the arithmetic processing program, and if the program verification does not verify the processing program as the appropriate program which satisfies the information use conditions included in the additional information, the request data provision section prevents the provision of the request data to the processing program; and
the arithmetic processing unit executes the arithmetic processing by the arithmetic processing program using the provided request data.

2. The information providing system according to claim 1, wherein the additional information includes arithmetic result data for verification used for the verification arithmetic processing.

3. The information providing system according to claim 2, wherein, among the provided information, at least the request data, the data for verification and the arithmetic result data for verification are encrypted in the information providing device and transmitted to the arithmetic processing device, and
in the arithmetic processing device, the program verification section decrypts the encrypted provided information.

4. The information providing system according to claim 2, wherein the program verification section verifies the arithmetic processing program by verifying whether or not result of arithmetic processing using the data for verification by the arithmetic processing program matches the arithmetic result data for verification.

5. The information providing system according to claim 1, wherein the additional information includes at least authority information that defines a range of arithmetic processing allowed for the arithmetic processing program in the arithmetic processing device.

6. The information providing system according to claim 5, wherein the program verification section verifies the arithmetic processing program by verifying whether or not, if the arithmetic processing program performs the verification arithmetic processing using the data for verification in the arithmetic processing device, the verification arithmetic processing is within the defined range of arithmetic processing in the authority information.

7. The information providing system according to claim 1, wherein in the arithmetic processing device, arithmetic processing is performed by the arithmetic processing program within the information usage conditions defined by the additional information.

8. An information providing method using:
an information providing device for storing information and for providing information in response to a request from an arithmetic processing device; and
the arithmetic processing device for performing arithmetic processing by a predetermined arithmetic processing program on the basis of provided information provided by the information providing device;
wherein the information providing device comprises:
an information storage unit that stores the information,
an information provision section provides the information to the arithmetic processing device as the provided information in response to a request data requested by the arithmetic processing device, and
an additional information generating unit which creates an additional information including a verification data for authenticating whether or not the arithmetic processing program of the arithmetic processing device is an appropriate program and information usage conditions which are the conditions under which the provided information is used in the arithmetic processing device for the arithmetic processing, and the additional information in addition to the request data as the provided information to be provided to the arithmetic processing device;
wherein the arithmetic processing device comprises:
an arithmetic processing unit which executes an arithmetic processing using the arithmetic processing program,
a program verification section which causes the arithmetic processing program to execute a verification operation using the verification d verifies whether or not verification arithmetic processing is within the range of the information usage conditions, and a request data provision section which determines whether or not to provide the request data to the processing program based on a result of the verification for verifying whether or not verification arithmetic processing is within the range of the information usage conditions, and wherein the method comprises:

a requesting step requesting that the arithmetic processing device requests the provided information to the information providing device;

an additional information step, that the additional information generating unit creates an additional information including a verification data for authenticating whether or not the arithmetic processing program of the arithmetic processing device is an appropriate program and information usage conditions which are the conditions under which the provided information is used in the arithmetic processing device for the arithmetic processing, and adds the additional information in addition to the request data as the provided information to be provided to the arithmetic processing device, a request data providing step, wherein only when the program verification section verifies the arithmetic processing program as an appropriate program which satisfies the information use conditions included in the additional information, the request data vision section provides the request data to the arithmetic processing program, a request data eventing step that if the program verification section does not verify the processing program as the appropriate program which satisfies the information use conditions included in the additional information, the request data provision section prevents the provision of the request data to the processing program, and an arithmetic processing step, wherein the arithmetic processing unit executes the arithmetic processing by the arithmetic processing program using the provided request data.

9. A non-transitory computer-readable media storing an information providing program executing each step of the information providing method according to claim 8 by a computer device.

* * * * *